(12) United States Patent
Cussol et al.

(10) Patent No.: US 8,495,833 B2
(45) Date of Patent: Jul. 30, 2013

(54) LIVE PLANT BOX

(75) Inventors: David Cussol, Poussan (FR); Paul Milhau, Vendemian (FR)

(73) Assignee: Thomas Fleurs SA, Entraigues sur la Sorgue (FR), part interest ( * ) Notice: Subject to any disclaimer, the term of this patent is extended or adjusted under 35 U.S.C. 154(b) by 325 days.

(21) Appl. No.: 12/809,179

(22) PCT Filed: Dec. 9, 2008

(86) PCT No.: PCT/EP2008/067069
§ 371 (c)(1),
(2), (4) Date: Aug. 25, 2010

(87) PCT Pub. No.: WO2009/077379
PCT Pub. Date: Jun. 25, 2009

(65) Prior Publication Data
US 2010/0313473 A1 Dec. 16, 2010

(30) Foreign Application Priority Data
Dec. 18, 2007 (FR) ...................................... 07 08839

(51) Int. Cl.
*A01G 9/02* (2006.01)
(52) U.S. Cl.
USPC ......................................................... 47/65.9
(58) Field of Classification Search
USPC ................ 47/65.9, 65.5, 66.1, 67, 68, 82, 83, 47/86
See application file for complete search history.

(56) References Cited

U.S. PATENT DOCUMENTS

| | | | | |
|---|---|---|---|---|
| 2,121,173 | A * | 6/1938 | MacPherson | 47/33 |
| 2,279,735 | A * | 4/1942 | Gates | 47/33 |
| 4,268,994 | A * | 5/1981 | Urai | 47/79 |
| 5,373,662 | A | 12/1994 | Wickstrom | |
| 5,675,933 | A * | 10/1997 | Kawaguchi et al. | 47/65.8 |
| 7,757,436 | B2 * | 7/2010 | Bindschedler et al. | 47/65.9 |

(Continued)

FOREIGN PATENT DOCUMENTS

| | | |
|---|---|---|
| CN | 85200939 U | 5/1986 |
| DE | 85 09 063 | 4/1986 |

(Continued)

OTHER PUBLICATIONS

Chinese Office Action, dated May 12, 2010, in Application No. 200810183973.8.

(Continued)

*Primary Examiner* — Monica Williams
(74) *Attorney, Agent, or Firm* — Young & Thompson (57) ABSTRACT

A device for decorative purposes, for the vertical cultivation of plants, includes: i) a cultivation support containing a cultivation substrate, and having holes on the front face thereof for the opening out of the above-ground part of the plants, ii) a rigid frame extending in a substantially vertical plane, defining a window in the front face of the cultivation support, and iii) a water reservoir, the cultivation support being placed over the water reservoir, and including at least one hydrophilic wick extending from the cultivation substrate to the water reservoir tank. The cultivation support is hydrated by a continuous supply of water by one or more hydrophilic wicks immersed in the reservoir. It may include an internal framework to give it rigidity and to prevent settling of the substrate in the lower part of the support. A method for obtaining such a plant box is also claimed.

20 Claims, 4 Drawing Sheets

U.S. PATENT DOCUMENTS

| | | |
|---|---|---|
| 2003/0044242 A1 | 3/2003 | Chen |
| 2007/0199241 A1* | 8/2007 | Peleszezak .................... 47/65.9 |
| 2008/0302009 A1 | 12/2008 | Frecon et al. |

FOREIGN PATENT DOCUMENTS

| | | |
|---|---|---|
| EP | 0 329 876 | 8/1989 |
| FR | 2 731 874 | 9/1996 |
| FR | 2 893 817 | 6/2007 |
| FR | 2 894 769 | 6/2007 |
| WO | 2005005747 A | 1/2005 |
| WO | 2007060331 A1 | 5/2007 |

OTHER PUBLICATIONS

International Search Report dated Apr. 14, 2009, from corresponding PCT application.

* cited by examiner

LIVE PLANT BOX

BACKGROUND OF THE INVENTION

1. Field of the Invention

The present invention relates to the field of indoor plant growing devices, and more particularly, decorative devices with an integrated watering system.

Its object is a decorative display for the vertical cultivation of plants, comprising a cultivation support and a water reservoir associated with a frame in which the cultivation support is hydrated by a continuous supply of water via a network of absorbent paddings immersed in the reservoir. A method for obtaining such a display is also claimed.

2. Description of the Related Art

Interior decoration often makes use of plants most commonly grown in pots or trays full of soil or other suitable substrate. To facilitate regular hydration of the plants, these containers may be equipped at the bottom with a water reservoir and an electric pump connected to the dripping system.

More originally, plant composition is arranged in the form of a display, comprising an essentially vertical medium surrounded by a frame, the whole being fixed to a wall or placed on a piece of furniture. For example, the medium may be pierced by housings in which are placed pots containing a cultivated plant. However, this system, which is easy to install and enables the plants to be instantaneously replaced when they finish flowering, requires the pots to be removed one by one at each watering. Other systems, also deprived of watering means, requiring being unhooked from the wall they decorate and being placed horizontally each time water is supplied. A method is also known whereby plants are attached to a fabric canvas fixed to a frame and fed drop by drop from a reservoir by an electric pump. This type of device has the disadvantage that it does not allow individual replacement of the plants, and in particular it requires a pump whose motor is noisy and requires an electrical connection.

BRIEF SUMMARY OF THE INVENTION

The object of this invention is to remedy these inconveniences by proposing a plant device for a decorative purpose, which is easy to install, maintain and replace. Another object of the invention is to provide an environment that is not only aesthetically pleasing and natural but also silent and totally independent. Yet another object of the invention is to enable plants to grow in a vertical position, durably and perennially. A further object of the invention is to achieve the cultivation using an integrated continuous irrigation system. The present invention will also enable normal growing methods to be used, in compost or another substrate, with a supply of water and fertiliser according to recipes known by professional and amateur gardeners.

The object of this invention is therefore a device for a decorative purpose for the vertical growing of plants, comprising:
i) a cultivation support enclosing a growing substrate and provided with holes on its front face for display of the aerial part of the plants,
ii) a rigid frame in an essentially vertical plane, delimiting a window before the front face of said cultivation support, and
iii) a water reservoir,
wherein the cultivation support is placed above the water reservoir and comprises at least one absorbent padding extending from the growing substrate to the tray of the water reservoir.

Therefore the substrate in which the root system of the plants develops is permanently moistened in its mass due to the capillary force providing a regular and continuous supply of water from the reservoir. Any absorbent material suitable for padding may be used, particularly cotton. The device therefore requires neither electricity to activate a pump (hence no wire, battery, timer) nor a complex watering system which is often the source of leakages, etc.

The padding is partially inserted in the cultivation support close to the root system of the plants and partially projects from it so that it hangs freely in the tray of the reservoir. According to an advantageous characteristic of the inventive device, at least one absorbent padding is divided into several strands distributed in the mass of the substrate, thus constituting a hydration network. This is particularly suitable for indoor plants which generally require sustained watering, which can easily be regulated by carefully selecting the quantity and length of the padding and strands used. On the other hand, a single padding will be used in preference if the display consists of cacti or Mediterranean plants suited to dry climates.

According to an interesting embodiment of the inventive device, the cultivation support comprises a pocket of a flexible or rigid material, flattened into the shape of a cushion, with one of the two essentially flat faces constituting the front face on which the aerial part of the plants is displayed. It will be readily understood that the cultivation support, whose essential element, at least due to its volume, is the pocket containing the substrate, must assume a shape that provides both a plant implantation surface that is sufficiently large to correspond to the decorative surface of the display, and a moderate thickness for limiting the space occupied behind the device. The face of the pocket onto which the plants are introduced constitutes the front face when the device is in position: it occupies the decorative surface of the display.

It will be noted that when the pocket is disconnected from the frame it naturally rests in a horizontal position so that this front face is then the upper face. In this case, the plant part is displayed vertically above the substrate pocket. This highlights the interesting feature of this device, whose live element may be introduced planted, or even grown prior to its installation, in a pocket suitable for the inventive device, so that the plant display is assembled whilst the plants are already green and colourful. In the interests of clarity, the device will be characterised according to this description and, unless otherwise indicated, in the condition and in the position it occupies when it is installed The decorative surface of the display is typically rectangular or square, although there is nothing to prevent displays from being circular, triangular, hexagonal or of any other shape, depending on the imagination of the decorator.

The pocket containing the substrate may be constructed of a flexible or rigid material, such as a fabric in natural or synthetic fibres, a non-woven textile material or a synthetic film of varying thickness that can be porous or perforated at various points. Of course, whether the material selected is flexible or rigid, it must be able to resist the weight when the substrate is moist and prevent fine particles from escaping. Moreover, it is recommended that an exchange of air be made possible to avoid rotting of the roots. For this reason the pocket should preferably be constructed in a flexible material permeable to air, for example a non-woven textile or horticultural fabric that retains a certain amount of moisture from the substrate whilst allowing evaporation and the passage of air. The physico-chemical properties of the substrate (drainage, pH, electrical conductivity, porosity, etc.) are of course selected according to the plant species to be grown (green plants, Mediterranean plants, carnivorous plants, cacti, succulent plants, etc.). A standard substrate of the "pre-mix" type, such as those sold commercially, may however be sufficient. Essentially this enables the plants to take root. The application of fertiliser is required after a few months. The experienced gardener knows how to select the growing substrate most suitable for the type of plant chosen.

When it is constructed of non-woven fabric, the pocket is advantageously stitched together at its edges, only leaving a slot free for the passage of each padding. It will be sufficient to cut the textile enough to allow the plant to pass through and be planted in the substrate, in which it will take root and develop.

The reservoir is designed as a simple watertight tray in a rot-resistant material suitable for containing water to which a fertilising mineral solution may be added. It is placed underneath the cultivation support so that the padding is in contact with the water that it contains. Of course the water must not be in direct contact with the pocket, which must be kept at a distance of at least one centimeter from the water level at all times. In fact, any contact may give rise to disease or rotting of the plant. Only the padding links the water supply and the pocket, by capillarity. It is then the substrate that feeds the water to the roots due to its drainage properties.

The function of the frame, apart from its aesthetic appearance, is to mask the cultivation support and the reservoir. Its dimensions therefore ensure that the support and reservoir overlap on the periphery of the device. It can also be used as a support element as described later. It must therefore be rigid and resistant, the wood stained, painted or treated with wood preservative, the coloured plastic moulded, suiting its method of manufacture in particular. Other materials may be used, at the option of the person skilled in the art, such as brushed aluminium, painted metal, untreated or aged, or even terra cotta, etc.

The three elements, frame, cultivation support and reservoir, are arranged so that they constitute a display in which the decorative element is made up of the plants installed on the cultivation support in the frame opening. These three elements may be connected in various ways, whether by shared fixings or not. For example, the cultivation support may, for example, be supported by means of a bracket above the reservoir, whilst the frame is simply positioned in front of this assembly to present an aesthetic facade. According to another embodiment the reservoir may be fastened to the base of the frame, enabling it to act as a repository to keep the device in a roughly vertical position.

In an advantageous embodiment of the invention the cultivation support comprises a detachable means of fixing to the frame. It is therefore convenient for removing the plant element from the device in order to care for the plants or replace them once they have finished flowering.

According to a preferred characteristic of the present invention, the cultivation support comprises a means of suspension that interacts with that on the rear face of the frame. For example, a set of hooks and rings, rods and pins, pressing means, or any other means known to the person skilled in the art may be used. In this case it is therefore the frame itself that performs the function of supporting the cultivation support.

According to a particular embodiment of the invention, the cultivating support includes a framework spanning the interior width of the pocket. The purpose of this inner framework is to ensure the rigidity of the pocket if it is of a flexible material, and/or to provide a base for the means of suspension of the cultivation support. It therefore occupies the entire width of the support, or more precisely of the pocket containing the substrate, so that the latter does not give way and the suspension points can be distributed effectively throughout the width of the cultivation support.

This framework can very simply be composed of a rod running into the upper section of the pocket, where a runner will be arranged. It may also be placed in the pocket and serve as a base for a hooking mechanism projecting from the outside of said pocket. Therefore, according to a preferred characteristic of the invention, the framework is provided with hooks which project from the outside of the pocket to provide the suspension for the support.

In a preferred embodiment of the inventive device the framework also comprises mechanisms for retaining the substrate, capable of preventing the sinking of said substrate into the lower section of the pocket.

According to a variant of the invention, the substrate retaining mechanisms are formed by a grill extending into part or all of the pocket.

According to another variant of the invention the substrate retaining mechanisms are formed by rods provided with shoulders placed horizontally at different heights of the pocket. The rods may be horizontal or vertical extensions of the framework and are immersed in the substrate. The shoulders are integral with the rods and form small horizontal platforms distributed in the mass of the substrate.

The rods may, for example, originate from the upper section of the framework and run down into the substrate, each rod carrying one or more combs whose teeth are positioned horizontally at different heights of the pocket.

The framework may advantageously also comprise means of securing at least one absorbent padding and the strands issuing from it. In particular, use can be made of a ring enabling the padding to be knotted, or of strand locking pins.

As can be seen, the inner framework is made to perform one or more functions to ensure the satisfactory operation of the live plant display:
  stiffening the pocket, preventing it from deforming and collapsing,
  preventing the substrate from sinking,
  tying the padding or its strands to the inside of the pocket,
  providing a base for the means of fixing the pocket to the frame.

In a preferred embodiment of the invention, the water reservoir is provided with a water level indicating mechanism. Use may be made, for example, of a float that is displaced according to the water level and is connected to an indicator visible on the side of the reservoir.

In a particular embodiment of the inventive device, the latter comprises:
i) at least two cultivation supports enclosing a growing substrate, provided with holes on their front face for the display of the aerial part of the plants and comprising at least one absorbent padding,
ii) the same number of water reservoirs each positioned below one of said supports, at least two cultivation supports being positioned side by side so that their front face lies in the same plane, and
iii) a rigid frame delimiting a single window in a plane that is essentially vertical, around the front plane defined by said cultivation supports.

In practice several cultivation supports may be placed side by side by fixing them to the rear of a single frame, the latter being provided with the same number of reservoirs each providing hydration of a substrate pocket. The pockets are advantageously suspended from hooking mechanisms arranged at regular intervals at the rear of the upper upright of the frame. The characteristics detailed above may be used in a similar manner here.

The inventive device may advantageously also comprise one or more of the following means:
- a box to protect the cultivation support at the rear of the frame, provided with aeration means;
- means of supporting the device placed in a vertically or slightly inclined position;
- means of fixing the device to a wall;
- means of assembling two or more devices side by side.

The protective box is designed to mask the rear of the device so that it has a neat appearance. This box is preferably designed so that the cultivation support is not confined, the moisture is able to evaporate and mould does not develop. To do this it is possible, for example, to provide a relief (fluting, spikes, etc.) on the inner face of the box to ensure that the pocket containing the substrate does not adhere to the wall of the box at any point on its surface, but instead is supported only at certain points. Openwork may also be arranged, alternatively or cumulatively, in particular on the lateral walls of said box.

The means of supporting the device in a vertical or quasi-vertical position may consist of an articulated support foot enabling the plant display to be exhibited on a piece of furniture in a slightly inclined position. a rod for the wall suspension may also be provided.

For assembling several boxes, rails or grooves may be provided on the sides of the reservoir, which will interact complementarily with a joining piece. Any means at the disposal of the person skilled in the art may of course be used to fix two units of the inventive device detachably or permanently.

A further object of the present invention is a method for the vertical cultivation of plants by means of a device according to one of the preceding claims, this method comprising essentially the stages consisting in:

a)—installing plants on a cultivation support enclosing a growing substrate and provided with holes for displaying the aerial part of said plants, said support comprising at least one absorbent padding extending from the growing substrate to the outside, b)—connecting the cultivating support to a rigid frame in an essentially vertical plane, above a water reservoir, so that the frame delimits a window around the face of the cultivating support carrying the aerial part of said plants, said face then constituting the front face of the cultivating support, c)—filling the water reservoir and soaking the padding in the water.

Once the device is installed it is then sufficient to add water regularly to the reservoir by means of a simple watering can to ensure that the plants develop. The stress from watering is therefore limited strictly to a minimum: the water supply is available to the root system over a long period of time, the water supplies being automatically regulated by the water consumption of the roots, which demands a proportional rise in liquid by capillarity. Therefore this system enables the plants to develop in conditions that are as favourable as in ceramic or plastic pots without anyone having to carry out frequent watering or control the quantities of water to be supplied.

The vertical cultivation process according to the invention may possibly include, in stage a), a phase for pre-cultivating the plants within the cultivating support, in the horizontal position. A variety of compositions can therefore be prepared at will, and these compositions can be left to take root properly in the garden or in a greenhouse before being installed in the vertical decorative device. This flexibility of use provides the user with a ready-planted cultivation support, for changing the cultivation support as a whole in a single operation. Such a product can easily be marketed and made available at any time. Of course, for enlightened amateurs, it is also possible to grow plants in pots and install them themselves on the support at any desired time.

The device and the vertical cultivation process that have just been described enable plants planted in the cultivation supports to develop normally, at a highly satisfactory rate. Once the substrate and the padding system have been selected, the plants adapt without difficulty to this method of cultivation in a durable fashion. It is simple, very reliable and practical. The plant display may have a strictly decorative, entertainment, practical (plants for consumption) or educational use.

The present invention will be more easily understood, and details of it will be apparent, in the light of the description that will be given of different embodiments, with reference to the attached figures, in which:

DETAILED DESCRIPTION OF THE PREFERRED EMBODIMENTS

Example 1

Construction of a Plant Display

Figure 1:
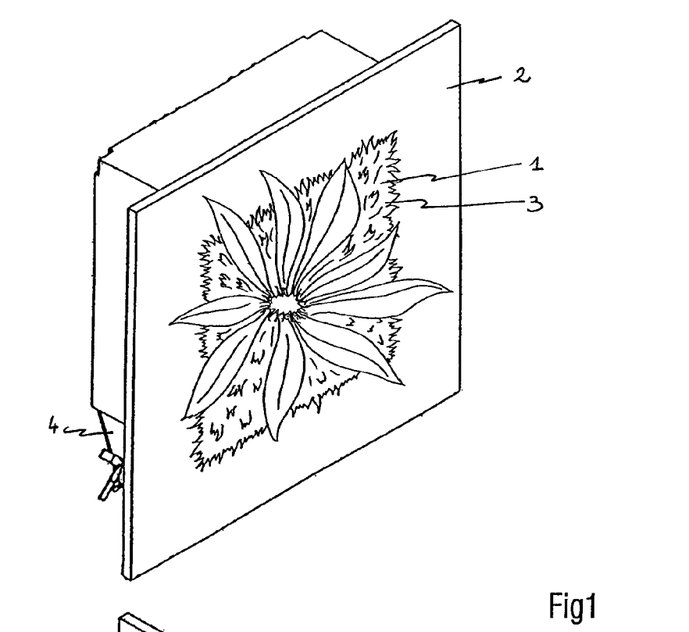
FIG. 1 is a perspective view of the front of the device according to the invention.
Figure 2:
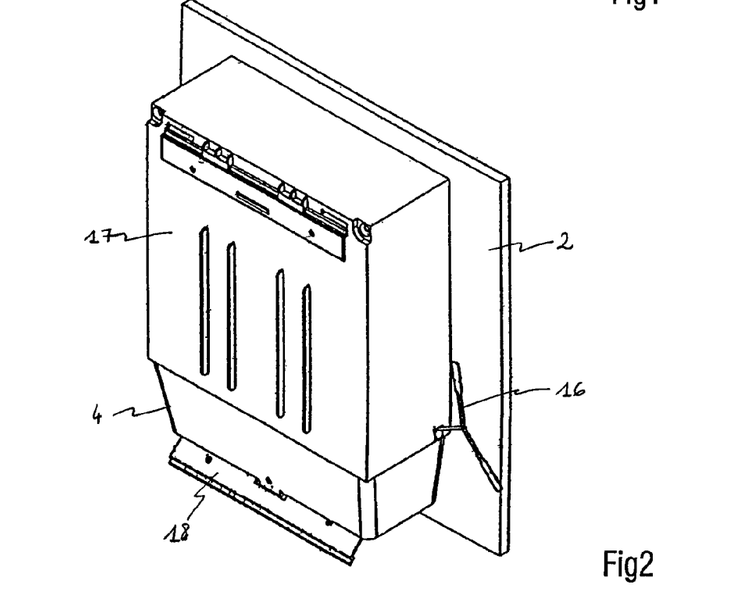
FIG. 2 is a perspective view of the rear of the device according to the invention.

In the exemplary embodiment illustrated here in FIGS. 1 and 2, the decorative display for the vertical cultivation of plants comprises cultivation support 1 placed above water reservoir 4, the latter being connected to frame 2. Frame 2 delimits a window 3 in an essentially vertical plane around the front face of cultivation support 1.

Reservoir 4 consists of a watertight tray of a rot-proof material fixed to the bottom of frame 2. It is fitted at its base with support bar 18 for maintaining the device on a piece of furniture. It is surmounted by box 17, which protects the cultivation support by masking it from view and preventing it from coming into contact with the wall. It is provided with float 16 which is displaced according to the water level and is visible on the side of the tray.

Cultivation support 1 encloses a growing substrate appropriate to the type of plants selected. It is provided with holes on its front face for the display of the aerial part of the plants, these holes being generally created by simple cutting at the time of installation of the plant into the substrate. Growing substrate 11 is hydrated by a continuous supply of water by means of absorbent cotton padding 5 immersed in the tray of reservoir 4. Padding 5 is divided into several strands 6 distributed in the mass of the substrate.

Figure 3:
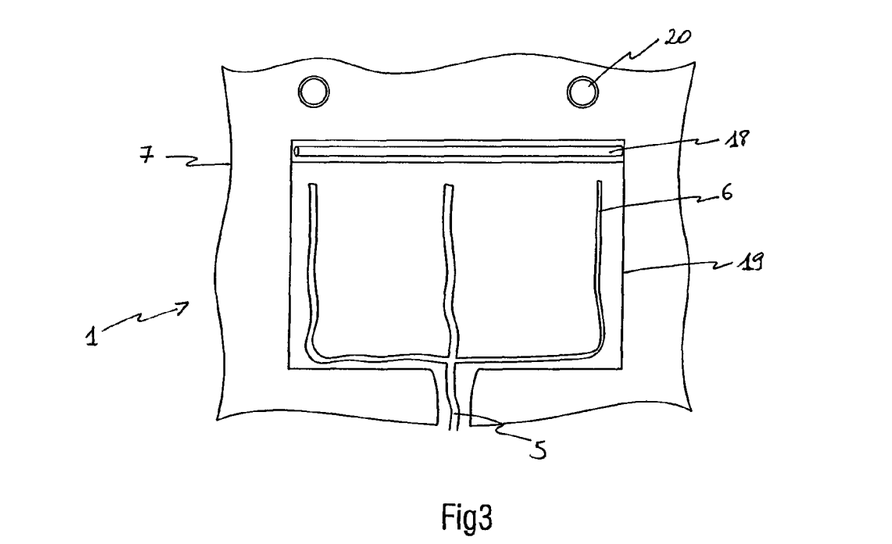
FIG. 3 is a representation of a cultivation support according to the invention comprising a stiffening rod.
Figure 4:
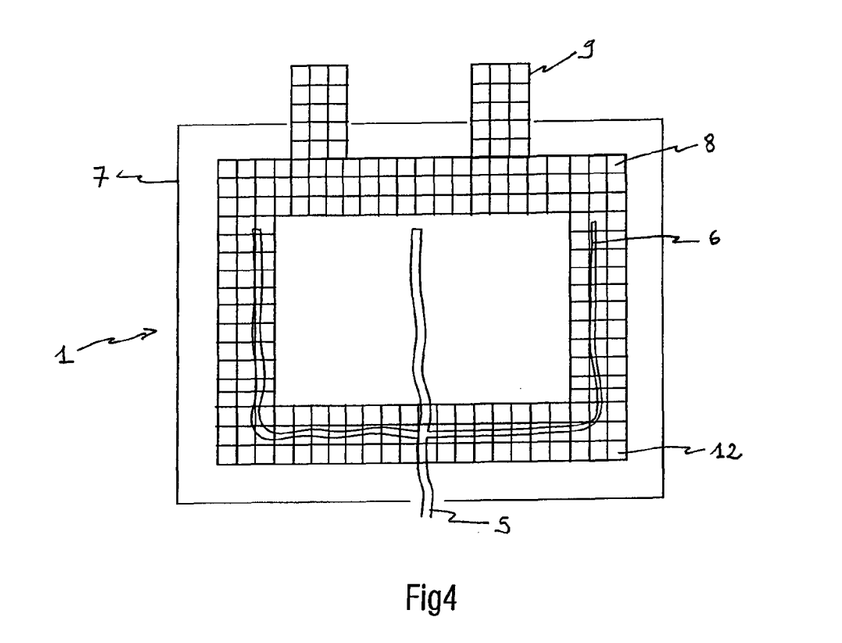
FIG. 4 is a representation of a cultivation support according to the invention comprising a stiffening and support grill.

As shown in FIGS. 3 and 4, cultivation support 1 comprises a pocket 7 in non-woven horticultural fabric permeable to air. It is flattened in the form of a cushion, stitched on its sides, leaving only an open slot for passage of padding 5. A framework 8 extends to the inside of the pocket throughout its width.

As shown in FIG. 3, pocket 7 is closed by stitching 19 leaving a free strip. Pocket 7 is then suspended by eyelets 20 fixed to this strip. Framework 8 consists of rod 18 running into a slide on the upper section of pocket 7.

FIG. 4 shows a more elaborate framework 8 serving as a base for suspension hooks 9 projecting from the outside of pocket 7. Framework 8 comprises substrate retaining grill 12 extending into part of pocket 7 to provide it with a certain stiffness and prevent said substrate from sinking.

Figure 5:
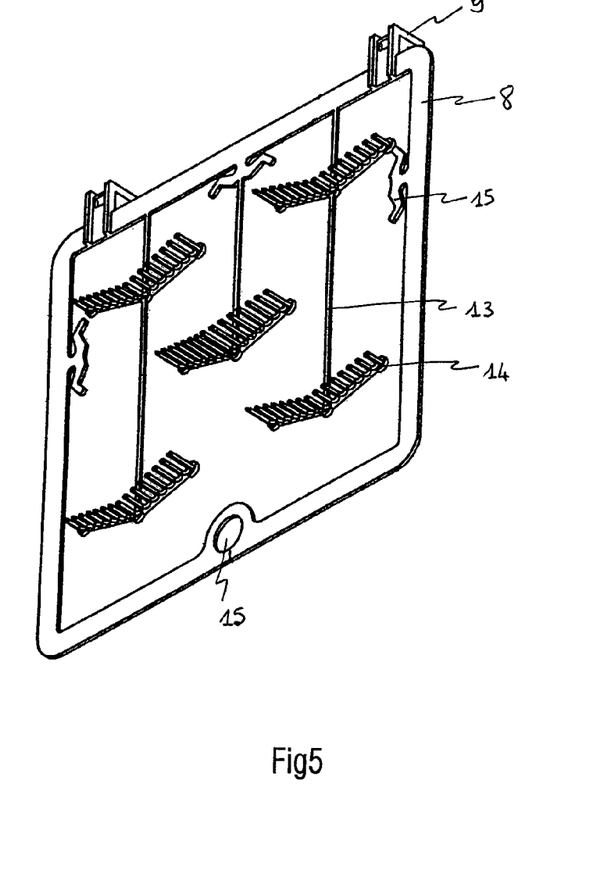
FIG. 5 is a perspective view of a stiffening and support framework for the cultivation support according to the invention.
Figure 6:
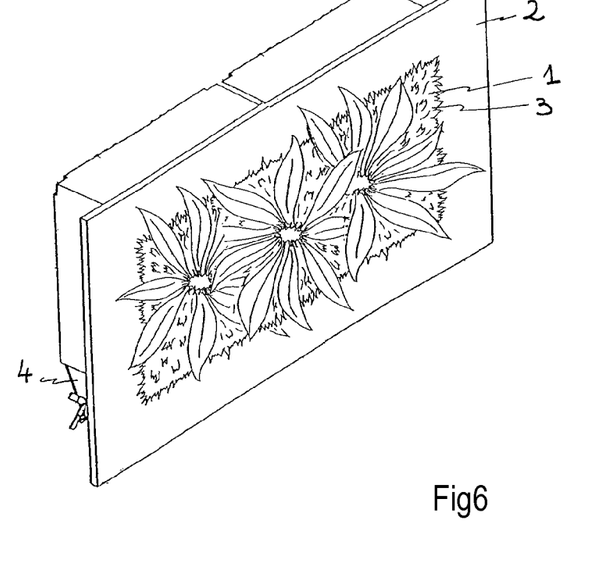
FIG. 6 is a perspective view of the front of the device according to the invention having at least two cultivating supports.
Figure 7:
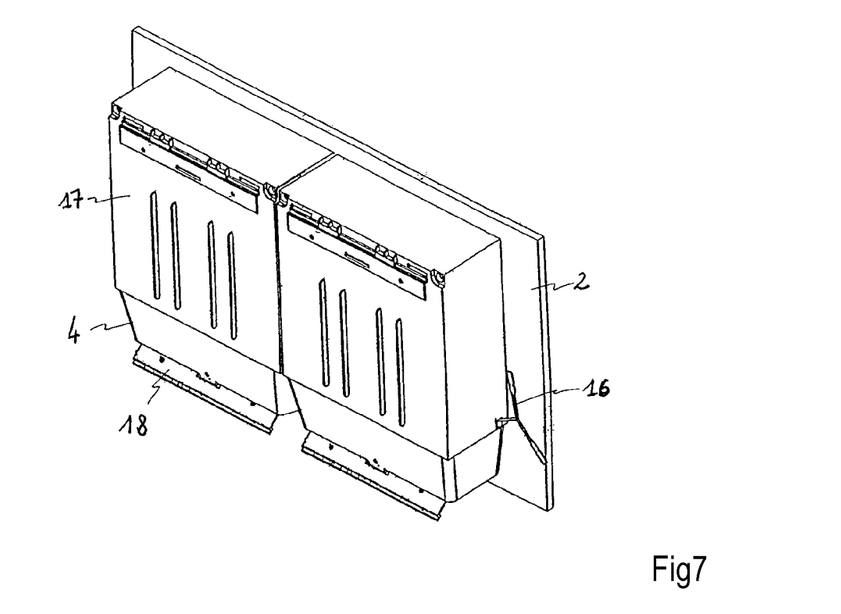
FIG. 7 is a perspective view of the rear of the device according to the invention having at least two cultivating supports.

According to another embodiment shown in FIG. 5, the substrate is retained by rods 13 provided with one or more shoulders 14 located horizontally at different heights of pocket 7. Here shoulders 14 assume the shape of combs whose teeth are positioned horizontally at different heights of pocket 7. Framework 8 also comprises the ring and lugs 15 for securing strands 6 of absorbent padding 5.

Example 2

Particular Embodiments

As shown above, several reservoirs and cultivation supports can be assembled side by side behind a single frame. The arrangement of such devices must take into consideration the dimensional constraints as well as the final weight of the device.

Three examples are detailed here. The frames are of stained wood, the reservoirs of moulded plastic. The pockets are of polypropylene (dimensions 19.5×22 cm). They are filled with horticultural compost in which is placed a moulded plastic framework, as shown in FIG. 5. The hydration padding is of cotton wool, 1.5 cm in diameter, consisting of three strands 0.5 cm in diameter, producing a network of 90 cm in each pocket.

1) Small Size: 1 Unit

| Dimensions of the frame: | outside | 31 × 31 cm |
|---|---|---|
| | inside | 16 × 16 cm |
| | width | 7.5 cm |
| | thickness | 1 cm minimum |
| Plastic tray, 1 × 1 liter: | width | 21 cm |
| | depth | 8 cm |
| | thickness | 8 cm |
| Protective box | height | 27 cm |

Total weight with water (1 l): 3.5 kg

2) Average Size: 2 Assembled Units

| Dimensions of the frame: | outside | 38 × 38 cm |
|---|---|---|
| | inside | 22 × 22 cm |
| | width | 8 cm |
| | thickness | 1 cm minimum |
| Plastic trays, 2 × 1 liter: | width | 21 cm × 2 |
| | depth | 8 cm |
| | thickness | 8 cm |
| Protective box | height | 27 cm |

Total weight with water (2 l): 6 kg

2) Large Size: 4 Assembled Units

| Dimensions of the frame: | outside | 38 × 92 cm |
|---|---|---|
| | inside | 22 × 76 cm |
| | width | 8 cm |
| | thickness | 1 cm minimum |
| Plastic trays, 4 × 1 liter: | width | 21 cm × 4 |
| | depth | 8 cm |
| | thickness | 8 cm |
| Protective box | height | 27 cm |

Total weight with water (4 l): 6 kg

Example 3

Cultivation

The prototypes used for the experiments have a tray with a capacity of 1 to 3 liters, which ensures a range varying from 3 to 10 days, according to the prevailing conditions (particularly heat). The bags used contain 1.3 liters of substrate in each of which are placed 3 to 6 plants. Monitoring for good hydration (watering) of the plants is reduced to a strict minimum: it is sufficient to keep the water in the tray.

The tests were carried out on different plant species commonly used for ornamentation. They showed that the plants adapted well. Over 90 varieties were installed in the device in various combinations. After 6 months only some of the plants failed to grow, attributable to reasons not connected with the inventive device itself: due either to an unsuitable substrate or to an incompatibility with the environment for other plants. This therefore represents a success rate higher than 95%, which is considered to be higher than that normally obtained for traditional cultivations.

The invention claimed is:

1. A device with a decorative purpose for the vertical cultivation of plants, comprising:
   a cultivating support (1) that contains a cultivating substrate (11) and that is provided with holes for a front surface of the cultivating support (1) for the display of an aerial part of the plants,
   a rigid frame (2) that extends in an essentially vertical plane, delimiting a window (3) in front of the front surface of said cultivating support (1), and
   a water reservoir (4),
      wherein said cultivating support is attached by removable attachment means above said water reservoir, and whereby said cultivating support comprises at least one hydrophilic core (5) comprising at least one strand of material that extends from the cultivating substrate up to a tank of the water reservoir.

2. The device according to claim 1, wherein said at least one hydrophilic core (5) is divided into several strands (6) that are distributed within the substrate (11).

3. The device according to claim 1, wherein the cultivating support (1) comprises a pocket (7) made of two essentially flat surfaces of flexible or rigid material, flattened in the shape of a cushion, whereby one of the two, essentially flat surfaces constitutes the front surface by which the aerial part of the plants is displayed.

4. The device according to claim 3, wherein the pocket (7) is made of an air-permeable, flexible material.

5. The device according to claim 3, wherein the cultivating support (1) comprises a framework (8) that extends inside a width of the pocket (7).

6. The device according to claim 5, wherein the framework (8) is equipped with hooks (9) that project outside of the pocket (7) to ensure suspension of the cultivating support (1).

7. The device according to claim 5, wherein the framework (8) also comprises elements for holding the substrate, able to prevent packing of said substrate in a lower part of the pocket (7).

8. The device according to claim 7, wherein the elements for holding the substrate are formed by a grid (12) that extends in one part of or throughout the pocket (7).

9. The device according to claim 7, wherein the elements for holding the substrate are formed by rods (13) that are provided with pallets (14) that are placed horizontally at different heights of the pocket.

10. The device according to claim 5, wherein the framework (8) also comprises means for docking (15) said at least one hydrophilic core (5) and strands (6) that emerge therefrom.

11. The device according to claim 1, wherein the cultivating support (1) comprises means for removably attaching to the frame (2).

12. The device according to claim 1, wherein the cultivating support (1) comprises means for suspending on the rear surface of the frame (2).

13. The device according to claim 1, wherein the reservoir (4) is equipped with a water level indicator element (16).

14. The device according to claim 1, further comprising:
at least one additional cultivating support (1), that contains the cultivating substrate, is provided with holes a front surface of each at least one additional cultivating support for the display of the aerial part of the plants, and comprises at least one hydrophilic core (5), and
at least one additional water reservoir (4), each of the at least one additional water reservoir being placed below one of said at least one additional cultivating support,
wherein the cultivating support and the at least one additional cultivating support are placed side by side in such a way that the front surface of the cultivating support and the front surface of each at least one additional cultivating support are coplanar, and
wherein the rigid frame (2) delimits the window (3) in the essentially vertical plane around the front surface of the cultivating support and the front surface of each at least one additional cultivating support.

15. The device according to claim 1, further comprising:
a box (17) for protecting the cultivating support (1) behind the frame (2), equipped with means for aerating;
means for supporting the device that is placed in the vertical position or is slightly inclined;
means for attaching the device to a wall;
means for assembling two or more devices side by side.

16. A process of vertical cultivation of plants using the device according to claim 1, comprising:
installing the plants on the cultivating support (1) that contains the cultivating substrate and that is provided with holes for the display of the aerial part of said plants, wherein said support comprises the at least one hydrophilic core (5) that extends from the cultivating substrate toward an outside;
combining said cultivating support with the rigid frame (2) in the essentially vertical plane, above the water reservoir (4), in such a way that said frame delimits the window (3) in front of the front surface of said cultivating support that carries the aerial part of said plants, wherein said surface then constitutes the front surface of the cultivating support,
filling said water reservoir and soaking said hydrophilic core in water.

17. The process according to claim 16, wherein installing the plants comprises a phase for precultivating plants in said cultivating support.

18. The device according to claim 1, wherein each of the at least one hydrophilic core (5) is a strand of absorbent padding (5) constructed and arranged to passively draw water via capillary force from the water reservoir (4) and distribute the water to the cultivating substrate (11) above the water reservoir (4).

19. The device according to claim 18, wherein each of the at least one hydrophilic core (5) is made of cotton.

20. A device for the vertical cultivation and display of plants, comprising:
a cultivating support (1) constructed and arranged to hold a cultivating substrate (11) that includes the plants and at least one of soil and compost, the cultivating support (1) being substantially planar and defining at least one opening in a front surface, the at least one opening being constructed and arranged to display an aerial part of the plants in an orientation substantially perpendicular to ground level;
a rigid frame (2) connected to the front surface of the cultivating support (1), the rigid frame extending in an essentially vertical plane that is substantially perpendicular to the ground level, the rigid frame delimiting a window (3) in front of the at least one opening of the cultivating support (1);
a water reservoir (4) disposed between the cultivating support (1) and the ground level; and
a strand of absorbent padding (5) constructed and arranged to passively draw water via capillary force from the water reservoir (4) and distribute the water to the cultivating substrate (11) above the water reservoir (4).

* * * * *

UNITED STATES PATENT AND TRADEMARK OFFICE
CERTIFICATE OF CORRECTION

PATENT NO. : 8,495,833 B2  
APPLICATION NO. : 12/809179  
DATED : July 30, 2013  
INVENTOR(S) : Cussol et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this

Fifteenth Day of September, 2015

Michelle K. Lee
*Director of the United States Patent and Trademark Office*